United States Patent [19]
Soderberg et al.

[11] Patent Number: 5,066,139
[45] Date of Patent: Nov. 19, 1991

[54] COUPLER VERIFICATION TEST CIRCUIT

[75] Inventors: Paulmer M. Soderberg; Kristin K. Foss, both of Menlo Park; Thomas E. Giles, Union City; Ralph A. Narciso, Woodside, all of Calif.

[73] Assignee: Raynet Corporation, Menlo Park, Calif.

[21] Appl. No.: 399,686

[22] Filed: Aug. 28, 1989

[51] Int. Cl.$^5$ .......................... H04L 1/14; H04B 3/46
[52] U.S. Cl. ................................... 371/20.1; 370/15; 371/20.5; 379/5
[58] Field of Search ................. 371/20.1, 20.5; 379/5; 370/15

[56] References Cited

U.S. PATENT DOCUMENTS

| | | | |
|---|---|---|---|
| 3,912,882 | 10/1975 | Beerbaum | 379/5 |
| 4,039,751 | 8/1977 | Couturier et al. | 371/20.5 |
| 4,688,209 | 8/1987 | Banzi, Jr. et al. | 370/15 |
| 4,707,848 | 11/1987 | Durston et al. | 379/1 |
| 4,727,592 | 2/1988 | Okada et al. | 370/15 |
| 4,773,070 | 9/1988 | Schumm et al. | 371/20.5 |
| 4,910,760 | 3/1990 | Reformato | 379/13 |

FOREIGN PATENT DOCUMENTS

| | | |
|---|---|---|
| 1401128 | 7/1975 | United Kingdom . |
| 2042715 | 9/1980 | United Kingdom . |
| 2131248 | 6/1984 | United Kingdom . |

Primary Examiner—Charles E. Atkinson
Attorney, Agent, or Firm—Dennis E. Kovach

[57] ABSTRACT

A coupler verification test circuit includes first and second circuits one of which is disposed at a head end of an optical fiber network and the other of which is disposed at a subscriber interface unit to be attached to the network when the head end is not operational. The subscriber interface circuit transmits instructions to a transceiver board in the subscriber interface unit for transmission to the network head end whereat the circuit thereat generates either no return signal, an acknowledgment return signal, or a default return signal. The test circuit at the subscriber interface unit then analyzes the return signal and visually indicates to a craftsman whether or not the transceiver board and other components of the SIU are operating correctly, e.g. whether or not the acknowledgement signal was returned and detected.

15 Claims, 9 Drawing Sheets

FIG_1

FIG_2

FIG_3a

FIG_3b

FIG_4a

FIG_4b

FIG_4c

FIG._5a

FIG_6a

FIG_6b

FIG_6c

COUPLER VERIFICATION TEST CIRCUIT

BACKGROUND OF THE INVENTION

The present invention relates to a coupler verification test circuit designed to assist personnel in installing a subscriber interface unit (SIU) on an optical fiber distribution network which does not have an operating head end, e.g. an operating office interface unit (OIU), during the installation procedure.

Optical fiber is becoming widely preferred over electrical wires for use in telecommunication networks, e.g. telephony and video. Though optical fiber has far superior bandwidth than electrical wires and is also immune to electromagnetic and radio magnetic interference, problems exist with optical fiber networks during installation and configuration thereof. Specifically, when installing a subscriber to an optical fiber system during initial system installation, oftentimes the system does not have an operating head end. Accordingly it is difficult to impossible for a craftsman to readily determine if SIUs are being correctly installed onto the network during SIU installation. After the head end has been installed and is operating it can easily be determined if any or all the SIUs are functioning properly. However, at that time, though it is possible to determine which if any SIUs have been improperly installed, it is troublesome and expensive to detach personnel to correct the problems causing severe inconvenience.

SUMMARY OF THE INVENTION WITH OBJECTS

It is an object of the present invention to provide a means and method of readily determining when an SIU is both correctly installed and functioning properly subsequent to connection to an optical fiber distribution network which does not have an operating head end.

These and other objects of the invention are achieved by a method of installing a subscriber interface unit ("SIU") onto an optical fiber telecommunications network configured so as to have an office interface unit ("OIU") which is to communicate to a plurality of SIUs when the network is operating, comprising the steps of:
attaching a first test circuit to the network at a location corresponding to where an operational OIU is later to be operating so that the network can later operate and communicate with remote systems outside the network, the first test circuit being connected to optical fiber means;
attaching electrooptic elements of the SIU to the optical fiber means;
attaching a second test circuit to the SIU;
initiating the second test circuit so as to generate an optical signal to be transmitted to the test circuit along the first optical fiber means
monitoring the second test circuit to determine if an error or acknowledgement return signal is received from the first test circuit and detected by the SIU so as to indicate whether or not the SIU is functioning properly;
the attaching, initiating and monitoring steps being done prior to having the operational OIU operating so as to communicate with the remote systems.

These and other objects of the invention will be further explained by reference to the following detailed description and drawings.

DESCRIPTION OF THE PREFERRED EMBODIMENTS

Figure 1:
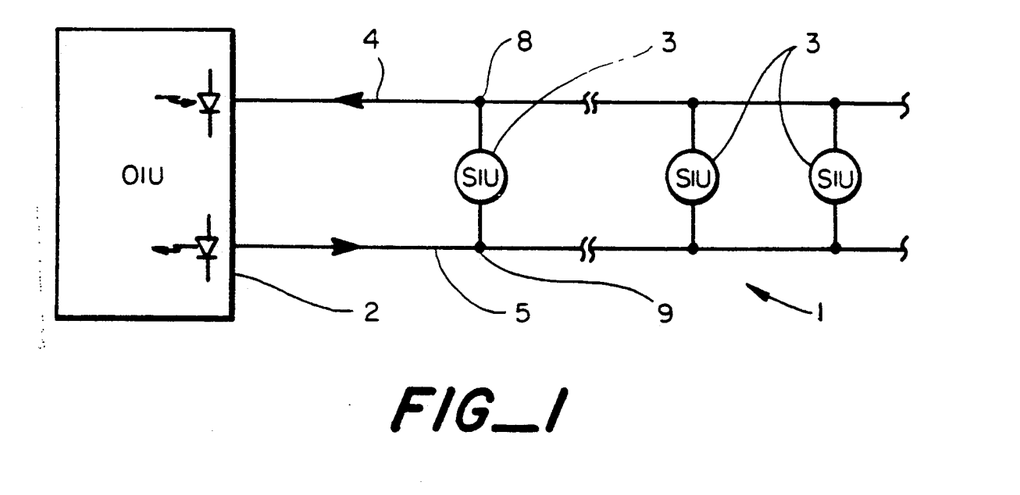
FIG. 1 illustrates a preferred bus architecture by which the method and apparatus of the invention are most useful.

FIG. 1 illustrates a preferred embodiment of the invention, this figure illustrating an optical fiber network 1 which includes a head end 2, e.g. OIU, which communicates with a plurality of subscriber interface units 3, e.g. SIUs. Communication between the OIU and the SIUs is achieved by first and second fibers 4, 5, the architecture illustrated in FIG. 1 comprising a bus architecture. The optical fiber 5 is generally referred to as a downstream bus relative to the SIUs, and the optical fiber 4 is generally referred to as an upstream bus relative to the SIUs 3.

When installing an optical fiber network such as that illustrated in FIG. 1, and in particular when attaching the various SIUs to the network 1, oftentimes an operating OIU has not yet been attached to the network. Accordingly, it is generally not possible to verify if any individual SIU 3 has been properly installed onto the network 1 at the time of installation, this determination being made long after installation of the particular SIU at the time the OIU is installed and turned on which creates problems because personnel have to be redeployed to the field to correct or replace any defective SIUs.

According to the invention, a bus/coupler verification test circuit is provided to assist personnel in installing the SIUs. Preferably, part of the circuity is attached to an area of a transceiver board 7 of the SIU. What the circuitry does is verify that the transceiver board 7 is optically coupled to the upstream and downstream optical fiber buses and that the transceiver circuitry is operating properly. The coupler verification test circuit comprises two separate test circuits, circuits A and B illustrated in FIG. 2. Test circuit A connects to the SIU transceiver, preferably through an interface connector on a transceiver board, and the function of this circuit is twofold. First, the circuit generates an electrical test signal which the transceiver board in turn converts to an optical signal and transmits onto the upstream optical bus 4 via a write optical coupler 8 the attachment of which to the fiber bus is being verified. Second, the circuit receives and interprets a return signal from the read bus 5 from the transceiver board via a read optical coupler 9 located on the transceiver board.

Figure 2:
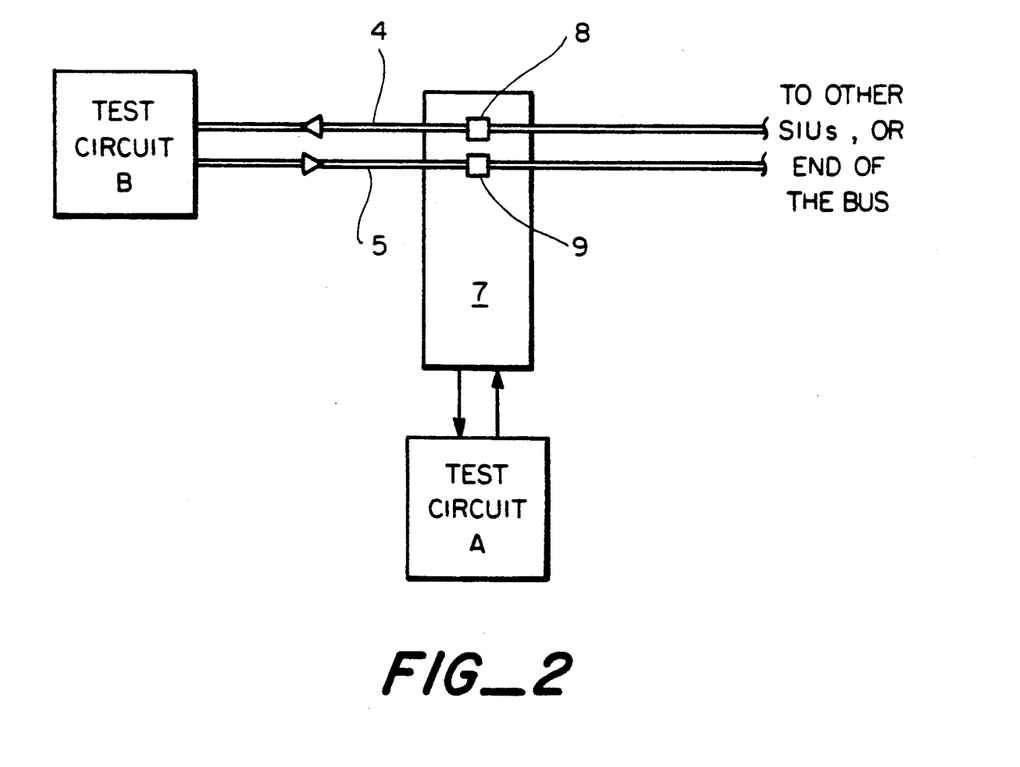
FIG. 2 illustrates a preferred embodiment for use in installing an SIU onto a network as illustrated in FIG. 1.

The other test circuit, test circuit B, is located at the beginning of the optical fiber bus where the OIU would reside when the network is operating and communicating with systems external to the bus, this latter test circuit being connected to both the upstream and downstream fibers via conventional optical couplers which are on the ends of the fiber buses. The function of this latter test circuit is to transmit a signal onto the downstream fiber bus 5 toward the SIUs. The type of signal it sends depends on whether or not it is receiving a specific signal from the upstream fiber bus 4 which is controlled by the test circuit A described above.

Preferred optical couplers 8, 9 are passive noninvasive components, preferred embodiments thereof being described by Campbell et al., U.S. Pat. No. 4,728,169, the disclosure of which is incorporated herein by reference. This reference describes a user friendly optical fiber coupler whereby light is coupled between a fiber core and an electrooptic transducer by passing the light through a buffer of the optical fiber. Further preferred coupler embodiments are described by Uken in U.S. Pat. No. 4,741,584; Kolt et al. in U.S. patent application Ser. No. 252,915 filed Sept. 30, 1988 and now abandoned; Uken et al. in U.S. patent application Ser. No. 383,828 filed July 21, 1989 now U.S. Pat. No. 5,029,962 issued July 9, 1991 Campbell et al. in U.S. patent application Ser. No. 137,317 filed Dec. 13, 1987 now U.S. Pat. No. 4,889,403 issued Dec. 26, 1989; Uken in U.S. patent application Ser. No 213,642 filed June 30, 1988 and now abandoned; and U.S. patent application entitled "Mechanism for Nesting an Optical Fiber in an Optical Coupler and Providing Positive Stop Opening and Closing Positions for the Coupler" by Saiia et al. being filed concurrently herewith, the disclosures of which are all incorporated herein by reference.

Figure 3A:
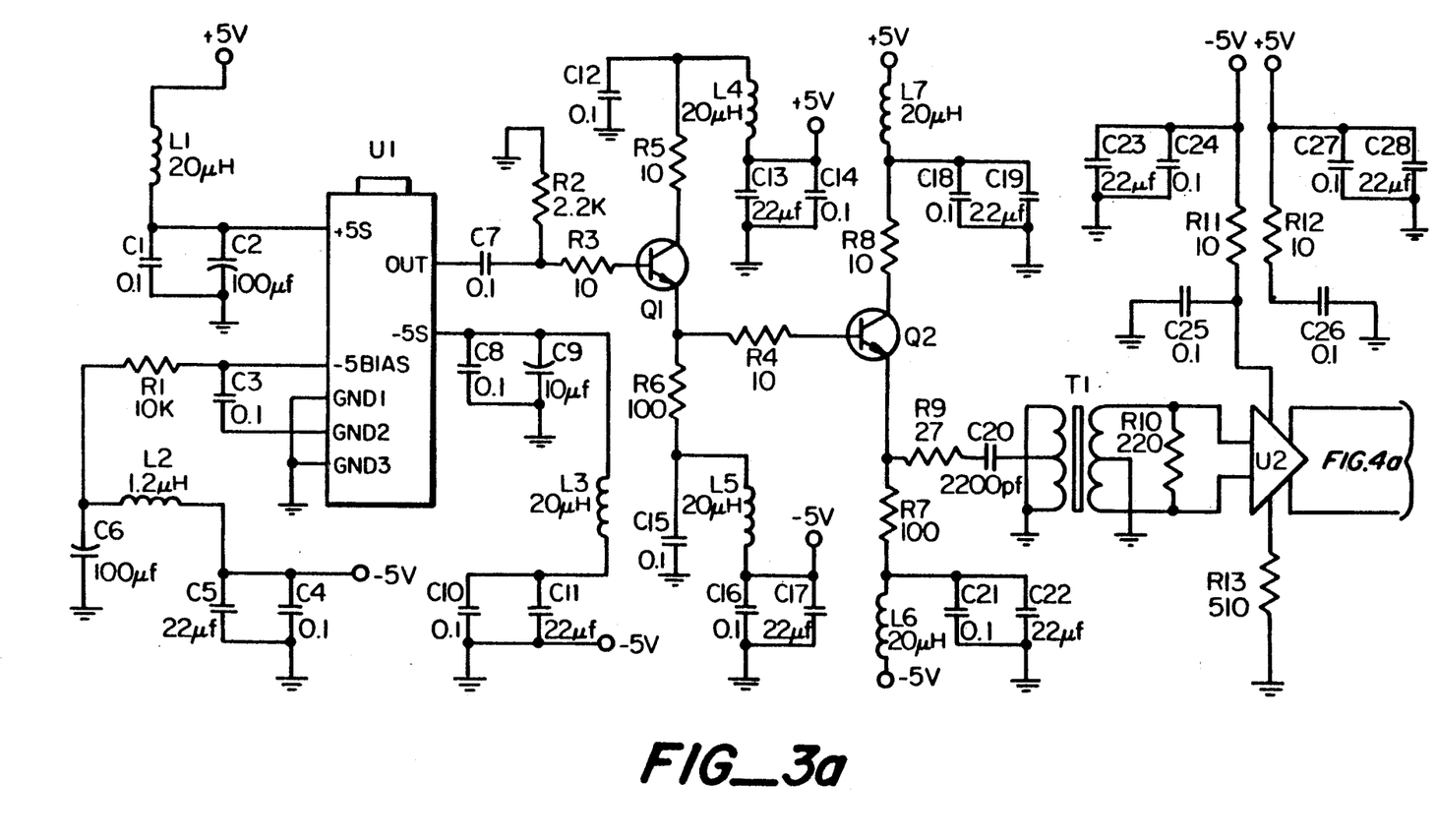
FIGS. 3a, 3b, 4a, 4b, and 4c together illustrate one preferred circuit for emulating an OIU (e.g. test circuit B in FIG. 2) while installing an SIU onto an otherwise inactive and nonoperating network.
Figure 3B:
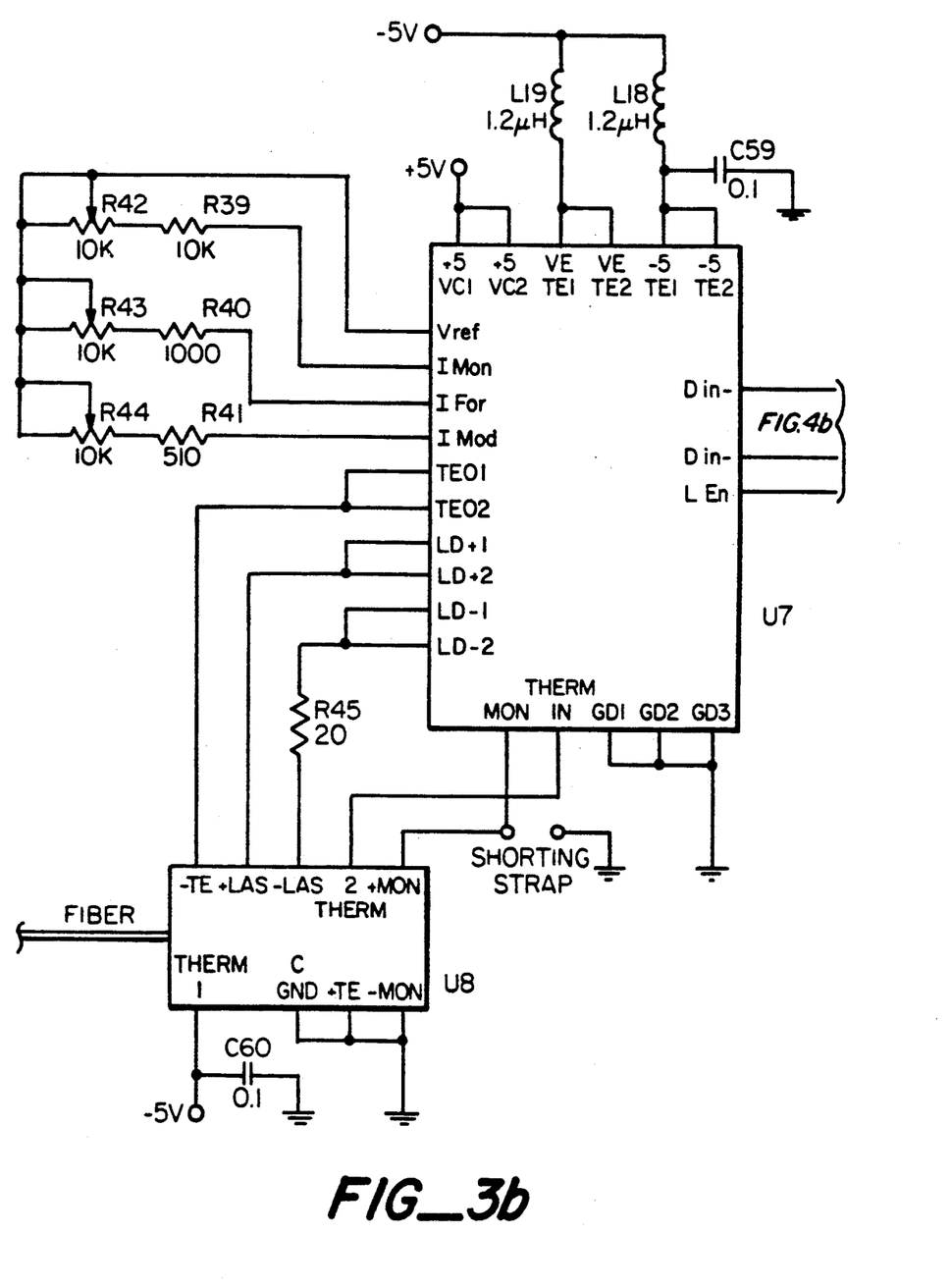
Figure 4A:
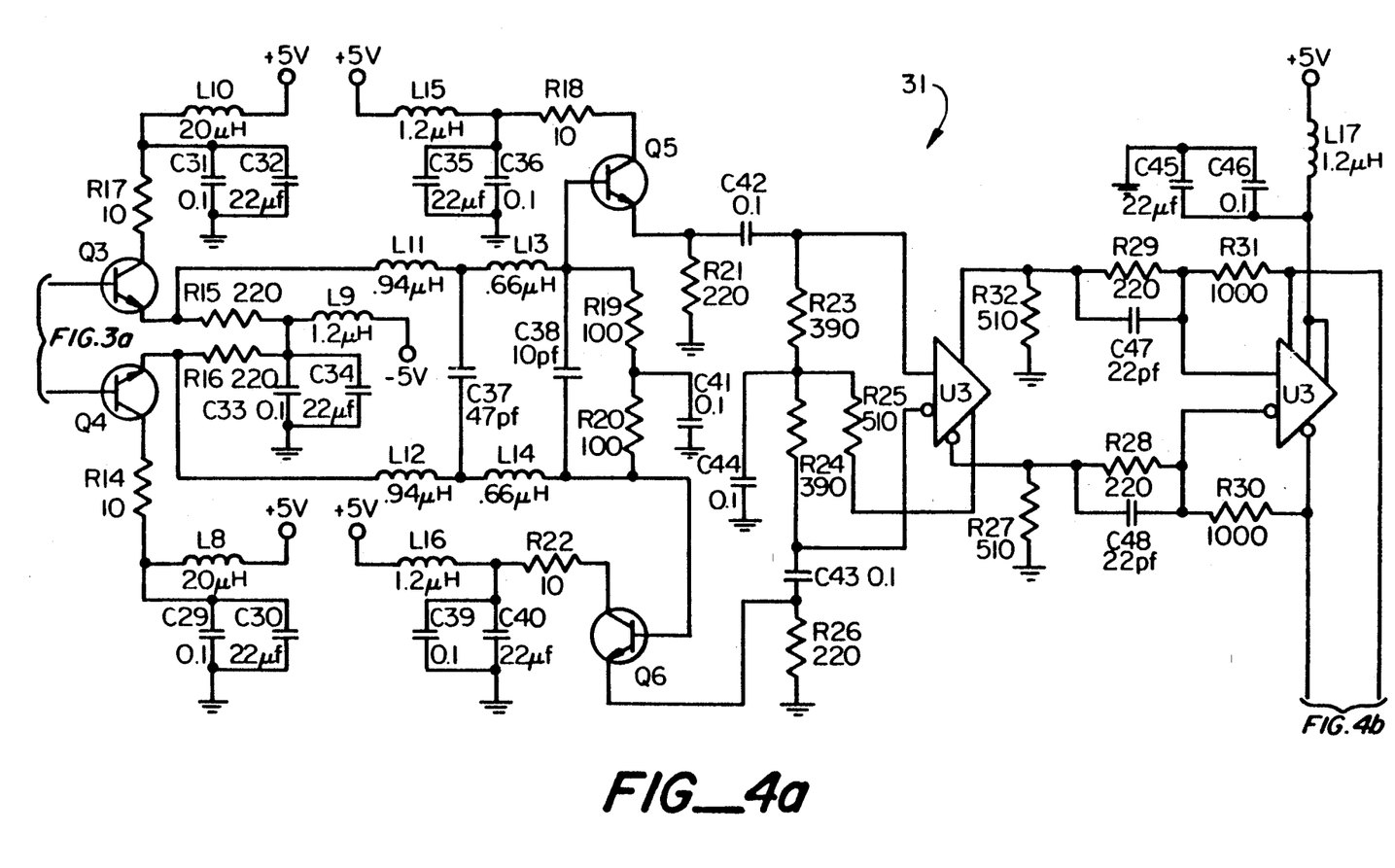
Figure 4B:
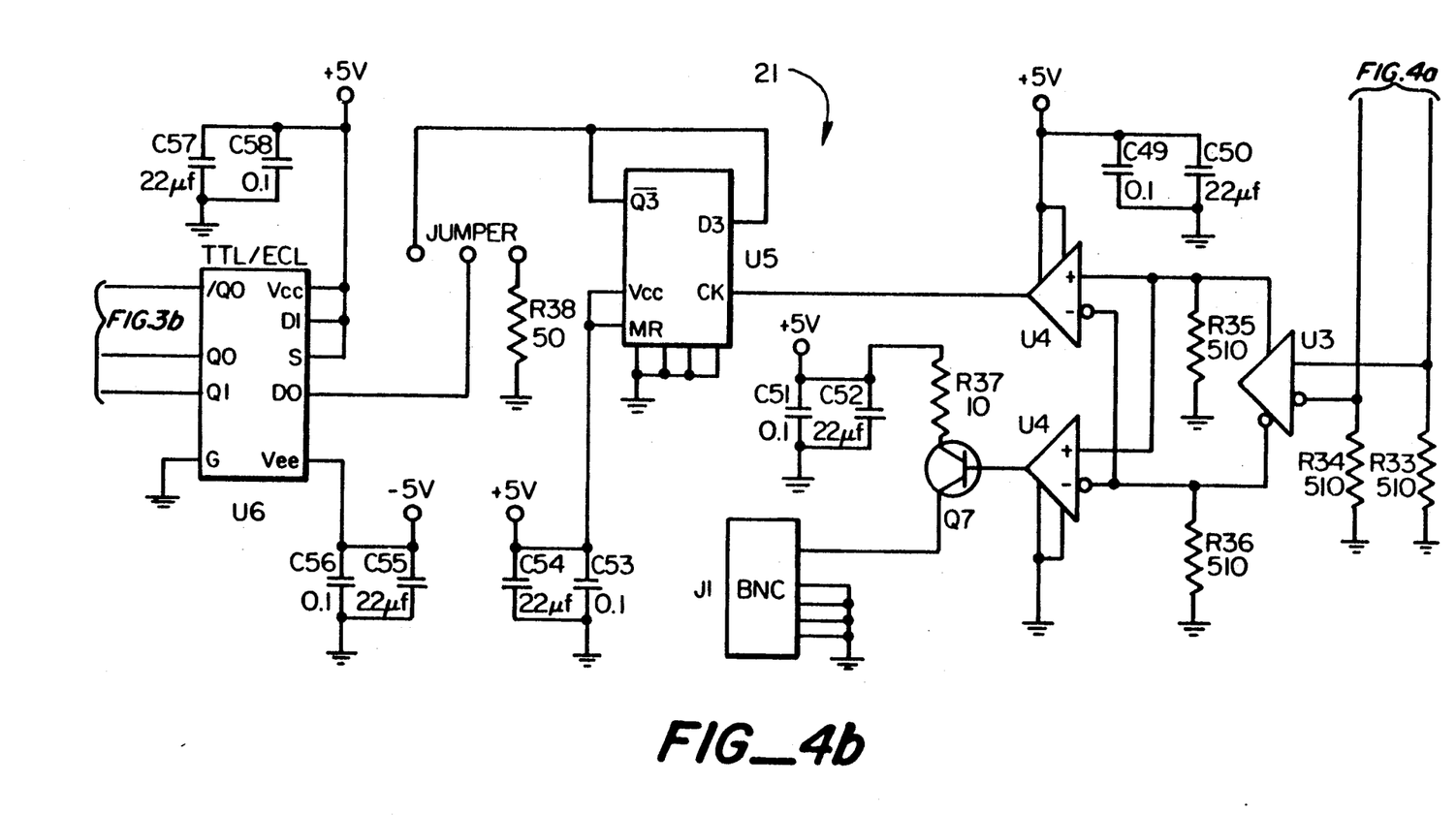
Figure 4C:
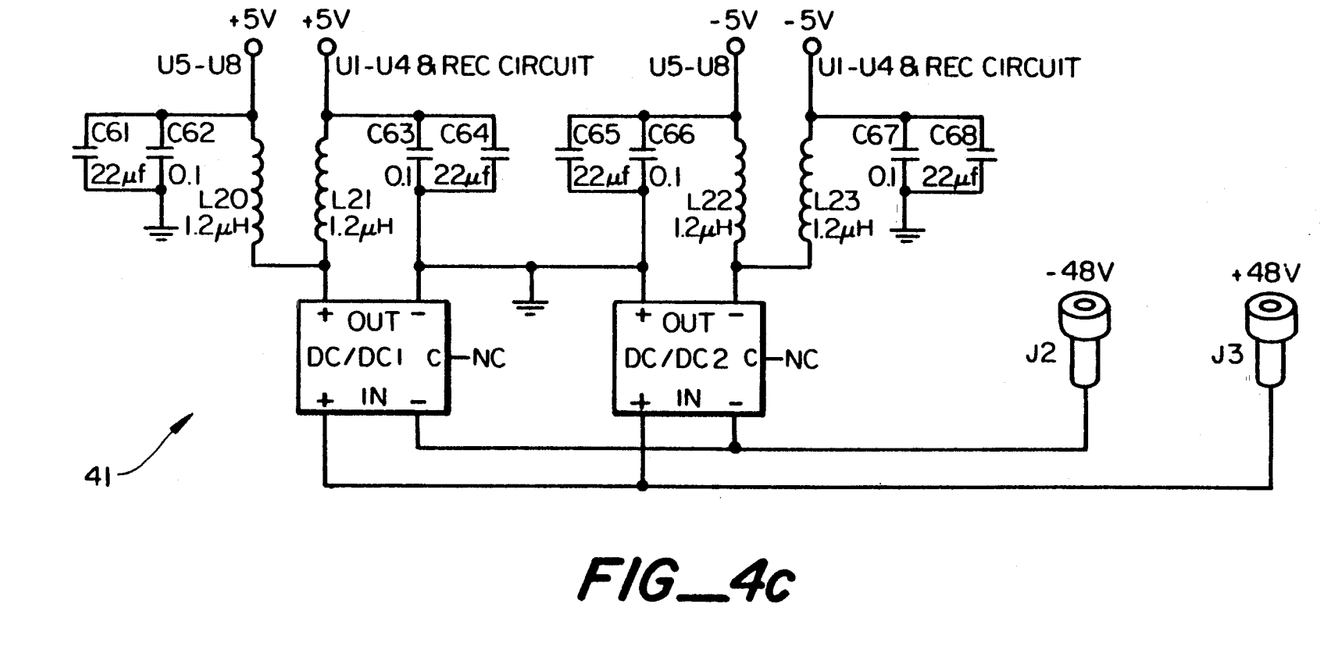

FIGS. 3a and 4c together illustrate one preferred embodiment of test circuit B to be located at the bus head end 2. Referring to FIGS. 3b and 4b an OIU laser driver and controller circuitry 21 is provided and is configured so as to generate either one of two possible signals, e.g. a default signal or an acknowledgment signal. In operation, absent a failure in the circuitry of FIGS. 3b and 4b or in any of the components in an OIU necessary to generate an upstream signal towards the SIU, the laser driver and controller circuitry will normally only emit onto the read bus a default signal or an acknowledgement signal, and in normal operation when no SIU coupler is trying to sign onto the network the default signal is continuously generated and sent by the laser driver and controller circuitry 21. By continuously sending the default signal, if an SIU is attempting to sign on but its writing mechanism is defective, it will be able to determine such by correctly reading the default signal continuously generated by the OIU test circuitry, and a visual indication of this state is generated (e.g. a red light). On the other hand, should the SIU coupler mechanism be improperly installed such that it can not detect any information from its read bus, then the SIU test circuitry will detect no signal which can be interpreted as at least a fault in connection with the read coupler and associated circuitry. Again a visual indication of this state (e.g. a red and yellow light) is generated for a craftsperson.

The OIU transceiver test circuit further includes circuitry shown in FIGS. 3a and 4a 31 for its receiver for detecting signals from SIUs on the write bus 4 which are then inputted to the laser driver and controller circuitry for determining and implementing whether or not a default or an acknowledgement return signal should be generated and sent. FIG. 4c illustrates power conversion circuitry 41 which converts DC voltage of approximately 48 volts to lower voltage levels (e.g. 5 volts) which drives the receiver and driver circuitry.

Figure 5A:
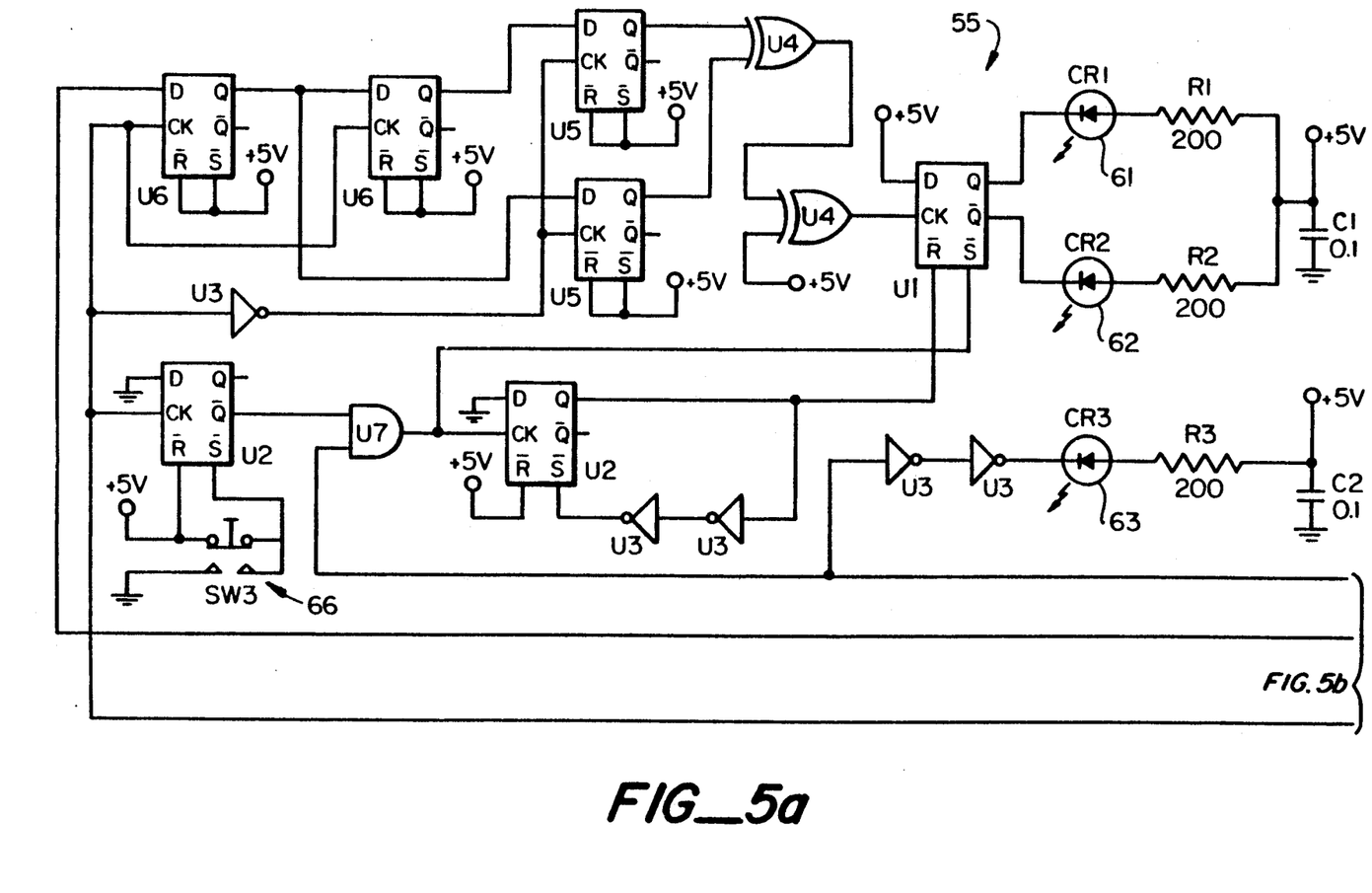
FIGS. 5a and 5b illustrate one preferred circuit for the SIU (e.g. test circuit A in FIG. 2)
Figure 5B:
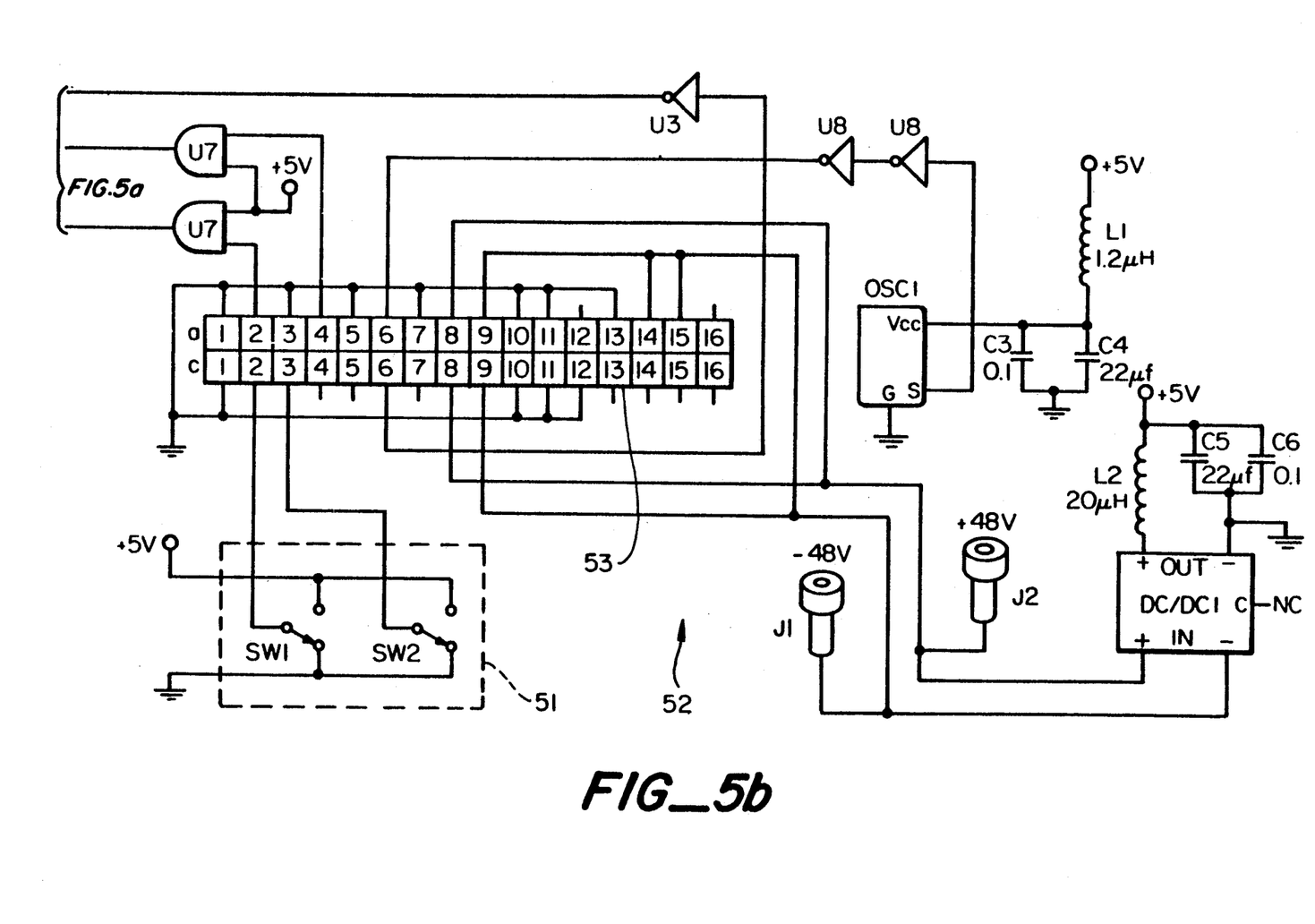

Referring to FIGS. 5a, 5b, an SIU coupler/transceiver test circuitry is illustrated whereby circuitry 52 generates electrical signals which are inputted at pins A1-A16 and C1-C16 into an SIU transceiver board which is electrically connected to a write coupler which includes a light emitter therein. Accordingly, the circuitry 52 generates a pattern of signals which are then converted by the light emitter into optical signals and injected onto a write bus and sent to the OIU. Reference numeral 51 illustrates part of a power tuning circuit which optionally allows the circuitry to instruct the light emitter to emit light onto the optical fiber write bus at any one of four levels so as to reduce power hopping concerns for the receiver associated with the OIU test circuit B. Circuitry 55 in the SIU coupler/transceiver test circuit analyzes the return signal detected from the SIU read bus which originates from the OIU test circuit B transmitter and analyzes this return signal to determine if a proper acknowledgement has been received.

A preferred way the circuitry A operates is as follows. If a proper acknowledgement is received, green LED 61 is activated so as to visually appear to a craftsman as a green signal which indicates the couplers and transceiver board are operating properly in the SIU just tested. On the other hand, when the circuitry operates to activate a red LED 62, a red light appears to the craftsman which indicates that the SIU coupler/transceiver test set A is detecting the default signal and improper installation has occurred. This indicates that the read coupler and associated circuitry at least are functioning properly but that the write coupler or associated circuitry is not operating properly. Finally, the circuitry activates both the red LED 62 and a yellow LED 63 simultaneously when no return signal is detected by the receiver circuitry. This indicates as a minimum that the read coupler and associated circuitry are not operating properly.

To initiate the test, the craftsman depresses momentary switch 66 within the circuitry 65 which clears all the registers and flipflops within circuitry 55 which initiates the test and for practical purposes immediately creates a visual response indicative of successful or unsuccessful assembly and attachment of the couplers and associated circuitry at the SIU.

Figure 6A:
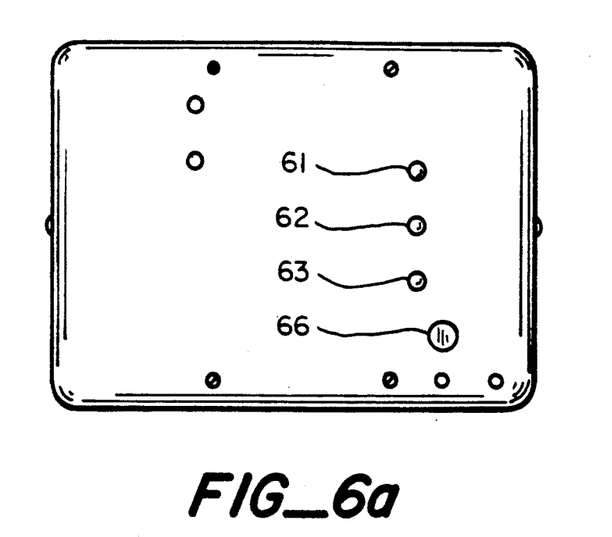
FIGS. 6a-6c illustrate top, side, and front views, respectively, of a box containing the SIU test circuit A shown in FIG. 2.
Figure 6B:
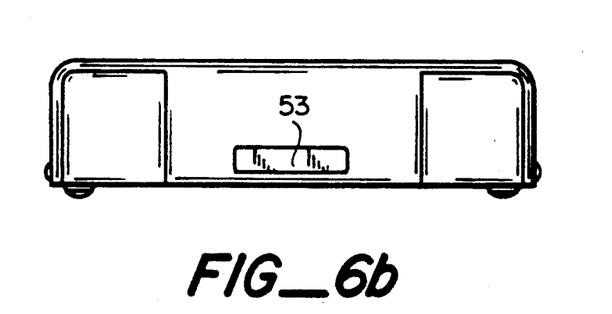
Figure 6C:
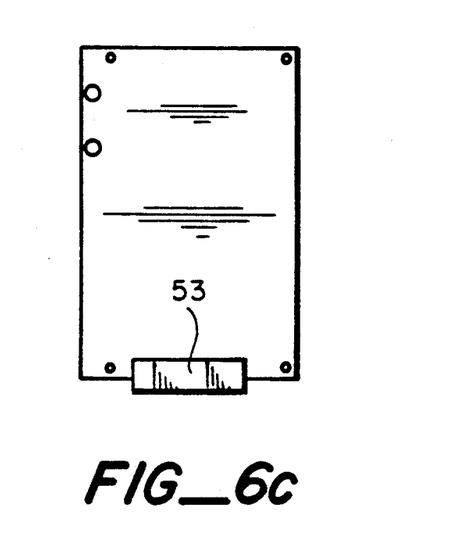

Mechanically, the SIU coupler/transceiver test set is illustrated in FIGS. 6a-6c which illustrate top, front and side views, respectively, of an exterior container of the circuitry. In this figure are illustrated the green, red, and yellow LEDs 61-63 respectively, the reset button 66, and the pins 53.

Though the invention has been described with respect to certain preferred embodiments thereof the invention is not to be limited thereby. Specifically, the test circuitry of the invention is useful for electrical telecommunication networks as well as optical, and it has utility with other architectures other than the preferred bus architecture described. Specifically, the test circuitry could be used for verifying correct installation of SIUs in ring architectures, star architectures, and tree and branch architectures, in addition to bus architectures, as well as architectures including combinations of each of these. In addition, the invention is useable for installations which include more than two transmission media connected to an SIU, as may be the case where extremely large amounts of band width are being transmitted whereby the SIU may be connected to a plurality of read communication lines, e.g. a plurality of read optical fibers as well as a plurality of write optical fibers. Accordingly, the invention is to be limited only by the appended claims.

We claim:

1. A method of installing a subscriber interface unit ("SIU") onto an optical fiber telecommunications network configured so as to have an office interface unit ("OIU") which is to communicate to a plurality of SIUs when the network is operating, comprising the steps of:

attaching a first test circuit to the network at a location corresponding to where an operational OIU is later to be operating so that the network can later operate and communicate with remote systems outside the network, the first test circuit being connected to optical fiber means;

attaching electrooptic elements of the SIU to the optical fiber means;

attaching a second test circuit to the SIU;

initiating the second test circuit so as to generate an optical signal to be transmitted to the first test circuit along the optical fiber means;

monitoring the second test circuit to determine if an error or acknowledgement return signal is received from the first test circuit and detected by the SIU so as to indicate whether or not the SIU is functioning properly; the attaching, initiating and monitoring steps being done prior to having the operational OIU operating so as to communicate with the remote systems.

2. The method of claim 1, the SIU containing a transceiver board having an external electrical pin connection, the second test circuit including pin means for electrically mating with the transceiver pin connection.

3. The method of claim 2, the initiating step further including the step of clearing registers within the second test circuit prior to generating the optical signal to be transmitted to the first test circuit.

4. The method of claim 1, further comprising the steps of successively attaching successive SIUs to the optical fiber means and for each SIU so attached attaching the second test circuit thereto and repeating the initiating and monitoring steps for the second test circuit for each SIU so attached.

5. The method of claim 4, the network comprising a bus architecture.

6. The method of claim 5, further comprising the step of connecting an operational OIU to the network after all the SIUs have been attached and their associated second test circuit attached, initiated and monitored.

7. The method of claim 1, the optical fiber means comprising first and second optical fibers, the first test circuit and electrooptic elements being connected to the first and second optical fibers, the optical signal generated by the second test circuit being transmitted along the first optical fiber, the error or acknowledgment return signal being generated by the first test circuit and being transmitted along the second optical fiber.

8. A method of installing a subscriber interface unit ("SIU") onto a telecommunications network configured so as to have an office interface unit ("OIU") which is to communicate to a plurality of SIUs when the network is operating, comprising the steps of:

attaching a first test circuit to the network at a location corresponding to where an operational OIU is later to be operating so that the network can later operate and communicate with remote systems outside the network, the first test circuit being connected to communication line means;

attaching signal transmission and reception elements of the SIU to the communication line means;

attaching a second test circuit to the SIU;

initiating the second test circuit so as to generate a signal to be transmitted to the first test circuit along the first communication line means;

monitoring the second test circuit to determine if an error or acknowledgement return signal is received from the first test circuit and detected by the SIU so as to indicate whether or not the SIU is functioning properly;

the attaching, initiating and monitoring steps being done prior to having the operational OIU operating so as to communicate with the remote systems.

9. The method of claim 8, the communication line means comprising first and second communication lines, the first test circuit and signal transmission and reception elements being connected to the first and second communication lines, the signal generated by the second test circuit being transmitted to the first test circuit along the first communication line, the error or acknowledgement signal being transmitted by the first test circuit along the second communication line.

10. An apparatus for installing a subscriber interface unit ("SIU") onto a telecommunications network configured so as to have an office interface unit ("OIU") which is to communicate to a plurality of SIUs when the network is operating, the network including first and second optical fibers, comprising:

means for attaching electrooptic elements of an SIU to the first and second optical fibers means for attaching a first test circuit to the network at a location corresponding to where an operational OIU is later to be operating so that the network can later operate and communicate with remote systems outside the network, the first test circuit being connected to the first and second optical fibers;

means for attaching a second test circuit to the SIU, the second test circuit having an initiate switch which causes an optical signal to be generated and transmitted to the first test circuit along the first optical fiber from the SIU, means for indicating if an error or acknowledgement return signal is received from the first test circuit and detected by the SIU so as to indicate whether or not the SIU is functioning properly.

11. The apparatus of claim 10, the indicating means comprising a plurality of lights visible to a craftsperson.

12. The apparatus of claim 10, the error or acknowledgement signal being received by the SIU off the second optical fiber.

13. The apparatus of claim 10, the indicating means being capable of indicating that no return signal from the first test circuit is being detected indicating incorrect operation of an SIU read coupler or associate circuitry.

14. The apparatus of claim 13, the indicating means being capable of indicating that the SIU detection circuitry is operating properly but not its transmitting circuitry.

15. The apparatus of claim 10, the second test circuit being connected to a transceiver board of the SIU.

* * * * *